United States Patent
Beall

[11] 4,309,217
[45] Jan. 5, 1982

[54] POLYCHROMATIC GLASSES AND METHOD

[75] Inventor: George H. Beall, Big Flats, N.Y.

[73] Assignee: Corning Glass Works, Corning, N.Y.

[21] Appl. No.: 180,964

[22] Filed: Aug. 25, 1980

[51] Int. Cl.³ .......................... C03C 3/04; C03C 3/26
[52] U.S. Cl. ........................................ 501/56; 501/13
[58] Field of Search ............ 428/410; 106/52, DIG. 6

[56] References Cited
U.S. PATENT DOCUMENTS

| | | | |
|---|---|---|---|
| 4,017,318 | 4/1977 | Pierson et al. | 106/DIG. 6 |
| 4,057,408 | 11/1977 | Pierson et al. | 106/39.7 |
| 4,092,139 | 5/1978 | Ference | 106/DIG. 6 |
| 4,134,747 | 1/1979 | Pierson et al. | 106/DIG. 6 |

Primary Examiner—O. R. Vertiz
Assistant Examiner—Mark Bell
Attorney, Agent, or Firm—Clinton S. Janes, Jr.

[57] ABSTRACT

A polychromatic glass article, colored by silver, is disclosed wherein the silver occurs as an anisotropic film at the surface of lithium bromide spherulites which crystallize directly on silver nuclei from lithium silicate and lithium aluminosilicate glasses. The article is produced by sequential radiation exposures and heat treatments of the glass.

10 Claims, 5 Drawing Figures

POLYCHROMATIC GLASSES AND METHOD

BACKGROUND OF THE INVENTION

The invention is concerned with a form of photosensitively colorable glass known as polychromatic glass. This is a transparent glass capable of having developed therein a range of colors that essentially spans the color spectrum. Color is developed in a polychromatic glass by certain combinations of radiation exposure and thermal treatment. Variation of color within a given glass results from variation in the initial exposure flux which is defined as the product of radiation intensity and exposure time.

As originally developed in the 1940's, photosensitive glasses were monochromatic, that is capable of having one characteristic color developed therein. Such a glass was so constituted that it underwent a change when exposed to short wave radiation, such as ultraviolet radiation. As a consequence, irradiated areas were capable of heat developed coloration, while non-irradiated areas remained substantially unchanged by such heat treatment.

U.S. Pat. No. 4,017,318, granted Apr. 12, 1977 to Pierson and Stookey, describes the general characteristics of a polychromatic glass, a particular type of such glass, and a procedure for developing a range of colors in such glasses. The polychromatic glasses disclosed in that patent may have a wide range of base compositions. However, each must contain silver, an alkali metal oxide (preferably $Na_2O$), fluoride, and at least one halide selected from the group of chloride, bromide, and iodide. The procedure includes exposures to high energy or actinic radiations selected from the group of high velocity electrons, X-radiations, and actinic radiations in the ultraviolet portion of the spectrum, preferably in the range of about 2800 Å–3500 Å. These exposures are followed by heat treatments at temperatures between the transformation range of the glass and the softening point thereof.

More specifically, in the Pierson-Stookey procedure, the glass is initially exposed to high energy or actinic radiation to photoreduce silver and thereby develop a latent image in the glass. This exposure determines the final color which will be produced in the glass. Thereafter, the glass is subjected to a heat treatment which causes the formation of colloidal silver particles in situ. These act as nuclei for the growth thereon of extremely small microcrystals of alkali metal fluoride and a mixed alkali-silver halide, e.g., $NaF+(Na,Ag)Cl$ and/or $(Na,Ag)Br$ and/or $(Na,Ag)I$. The nucleated glass is then cooled—conveniently to room temperature but, in any event, to a temperature at least 25° C. below the strain point of the glass—and again exposed to high energy or actinic radiations. This second exposure intensifies the ultimate color, the hue of which was previously determined via the first exposure. Finally, the glass is reheated to a temperature between about the transformation range and the softening point of the glass. This produces the desired colors in the glass by deposit of metallic silver as discrete colloidal particles and/or deposited on the surface and/or within the alkali metal fluoride-mixed halide microcrystals.

The quantity of silver precipitated, and the geometry thereof, as well as, perhaps, the refractive index of the crystals, are deemed to determine the color produced. However, the colors can be achieved with very low silver contents and exhibit characteristics similar to interference colors. Hence, it was surmised that at least one of the three following circumstances is present: (1) discrete colloidal particles of silver less than about 200 Å in the smallest dimensions; (2) metallic silver deposited within alkali fluoride-mixed halide microcrystals, the silver-containing portion of the microcrystals being less than about 200 Å in the smallest dimensions; and (3) metallic silver deposited upon the surface of said microcrystals, the silver-coated portion of the microcrystals being less than about 200 Å in the smallest dimension.

The patent further teaches that a sequence of colors may be developed by progressively increasing the magnitude of the exposure flux in the initial exposure step. Thus, progressively increasing the radiation flux (by increasing intensity, time, or both) successively produces pale yellow, green, blue, violet, red, orange, and dark yellow colors.

U.S. Pat. No. 4,092,139, granted May 30, 1978 to J. Ference, discloses an alternate color developing procedure. In this procedure, the second exposure (the reexposure) of the Pierson-Stookey method is carried out at a temperature between 200 and 410° C. to cause the metallic silver to precipitate. This obviates the separate reheating step.

U.S. Pat. No. 4,134,747, granted Jan. 16, 1979 to Pierson and Stookey, describes a procedure wherein the potentially polychromatic glass is melted in a reducing atmosphere. During the color development procedure, this modification produces a so-called reverse opal effect. Exposed portions of the glass remain transparent, although colored, and unexposed portions of the glass become opacified.

The earlier Pierson-Stookey U.S. Pat. No. 4,017,318 indicates that the exact reaction path leading to coloration is not known with certainty. However, a proposed explanation is that silver nuclei are photosensitively precipitated. Cerous ions are used as a photosensitizing agent, as illustrated by this equation: $Ag^+ +Ce^{+3} +h\nu \rightarrow Ag° +Ce^{+4}$. The nucleation and growth of complex silver plus alkali metal (Na) halide crystals is then proposed as follows:

C is a crystallite of the nature $(Ag°)_n x(Na^+ +Ag^+)X$ and $X^-$ is a halide ion. The development of the colored species, resulting from a second radiation step and second heat treatment, is then expressed as:

$CmAg°$ is a crystal having granular particles of metallic (m) silver formed on or dispersed within it.

The patent provides a photomicrograph illustrating the acicular morphology observed in crystals present in the glasses following coloration. It points out that such crystals are believed to consist of a complex alkali fluoride-mixed halide combination which crystals may differ from the conventional cubic structure of the alkali fluoride. Thus, the complex crystals observed in the colored polychromatic glass exhibited the shape of elongated pyramids with length-to-width ratios greater than two. This degree of anisotropic morphology can vary widely, depending upon the base composition of the glass and the heat treatment applied thereto. The blackened tip of the crystal represents silver concentrated in or on the tip of the crystal. In the colored glasses prepared according to the general method described above, the crystals will be randomly oriented.

In summary then, photosensitive glasses, as orginally developed, were monochromatic and were developed by a combination of one exposure to ultraviolet radiation plus one heat treatment. A unique characteristic of polychromatic glass is its capability of having developed therein a range of colors through a combination of two radiation exposures and two heat treatments. In terms of crystal development, the polychromatic glass color development has been ascribed to an initial reduction of a small amount of silver as nuclei. This is followed by growth thereon of a complex alkali fluoride-mixed halide, pyramidal-type crystal. Ultimately, photoreduction of silver occurs with precipitation at the extremities of the halide crystals grown on the original silver nuclei.

PURPOSE OF THE INVENTION

The key to full color developement, from the microstructural point of view, was the dendritic growth of a secondary halide, (Na,Ag)Cl, (Na,Ag)Br, or (Na,Ag)I, or solid solutions of these, upon the photonucleated NaF cubes. These pyramidal crystals grew outward from the fluoride crystals. Because of the binary solid solution crystallization behaviour of silver and sodium in these secondary halides, silver was concentrated in the residue at the apices.

This analysis of the phenomena involved indicated that the fluoride crystals were incidental to the color development. Thus, it appeared that it should be possible to bypass the fluoride crystallization and directly nucleate the secondary halides (the sodium and silver chlorides, iodides and/or bromides) in a silver-containing glass. This would greatly simplify the process and potentially expand its scope.

Accordingly, attempts were made to photonucleate sodium chloride, bromide and iodide directly from a wide range of different base glasses. The trials were completely unsuccessful. This suggested that only sodium fluoride could be easily precipitated directly upon silver nuclei.

SUMMARY OF THE INVENTION

I have now discovered that direct deposition onto silver nuclei can be achieved without sodium or fluoride ions being present. This is accomplished by deposition of lithium bromide onto silver nuclei from lithium silicate and aluminosilicate glasses. These lithia glass systems are especially advantageous because they provide lower melting glasses without sacrificing chemical durability and with high halide retention during melting.

My invention, then, resides in a silver-containing, polychromatic glass article wherein the glass composition has a total silver content of at least 0.005% by weight, and at least a portion of the article is characterized by the presence of spherulites of lithium bromide (LiBr) crystallized on silver nuclei and by color-producing, anistropic silver films, at or on the surface of the LiBr spherulites. It further resides in a method of making a polychromatic glass article wherein at least a portion of the article is integrally colored by silver, which consists of melting a glass batch containing the constituents of lithium bromide and silver, forming an article from such melt, exposing at least a portion of the article to high energy or actinic radiation selected from the group consisting of high velocity electrons, X-radiations and ultraviolet radiations, heating at least the exposed portion of the article to a temperature between the transformation range and the softening point of the glass for a time sufficient to cause formation of silver nuclei and growth of lithium bromide spherulities thereon which contain silver bromide dissolved therein, cooling the glass to concentrate silver bromide in the surface of the lithium bromide spherulites, re-exposing the previously exposed portion of the glass to high energy or actinic radiation, reheating at least the exposed portion to cause formation of metallic silver, and cooling the article.

GENERAL DESCRIPTION

The present polychromatic glasses are broadly similar to the prior Pierson-Stookey glasses in that they develop a range of colors, they involve silver nuclei, and they are developed by successive irradiation and heat treatment steps. However, they possess a number of distinctive features or characteristics which render them very different as well as useful.

Articles in accordance with the invention are produced from lithium silicate or lithium aluminosilicate base glasses containing, as essential additives, effective amounts of bromine and silver. In addition, minor amounts of other alkali metal oxides, of alkaline earth metal oxides, and of other glass making oxides, such as boric oxide, may be present. These modify glass melting properties and/or modify such secondary properties as refractive index and chemical durability.

A content of at least 0.005% silver by weight is required to provide effective coloration within a reasonable exposure time. In general, amounts over 0.5% are not only wasteful economically, but also may lead to the characteristic yellow color of reduced silver in the glass. Particularly effective glasses for coloration purposes contain at least 10% lithia ($Li_2O$) and have an $Al_2O_3/Li_2O$ ratio well below unity. Alumina may be beneficial in stabilizing the glass, although not essential to the basic purpose of coloration.

Soda ($Na_2O$) and chloride (Cl) may be present in amounts relatively smaller than lithia and bromide, respectively, without deleterious effect. However, neither appears to significantly improve photochromatic behavior. The presence of iodide may be desirable to speed up nucleation and color development, but tends to produce brownish hues.

It is recognized that halides are lost in varying degree during melting. For example, losses may be negligible with cold crown melting in a vertical melting unit. In such a melter, batch is added at the top and molten glass withdrawn from the bottom. On the other hand, substantial losses may occur with open melting, such as experimental melting in crucibles. In general then, the bromine level, in a calculated batch, should be in the range of 1-15 weight percent to yield an analyzed content of 1-4% in the melted glass. It may be supplemented by a lesser amount of chloride. Also, it is customary to include cerium oxide as a sensitizing agent, and tin and antimony oxides as thermoreducing or redox agents.

The preferred composition components and ranges, as calculated from the batch on the oxide basis in weight percent, are as follows: 70–85% $SiO_2$, 0–15% $Al_2O_3$, 10–20% $Li_2O$, 0–4% $Na_2O$, 1–15% Br, 0–4% Cl, 0.01–0.3% $CeO_2$, 0–0.5% SnO, 0–0.5% $Sb_2O_3$ and 0.005–0.5% $Ag_2O$.

Glass batches may be prepared in usual manner with optical quality raw materials normally being used. The basic requirements are sources of lithium, bromide, silver and silica. In addition, cerium oxide is required if actinic radiation is subsequently employed.

The glasses may be melted in conventional manner with appropriate attention being given to redox control in the glass. Thus, a more reduced glass may be achieved by increasing the tin oxide content, increasing melting temperature, or providing a more reducing melting atmosphere. Conversely, the glass may be more strongly oxidized with increased antimony, lower melting temperature, or use of nitre in the batch.

The present glasses may be melted at temperatures on the order of 1300° C., the use of lithia as a glass modifier providing a lower melting glass than other alkaline oxides. The glass melt may be shaped to desired form by rolling, pressing, or other known glass forming procedure.

The glass article, in a latent or potentially polychromatic state, may then be successively irradiated and heat treated to develop the polychromatic potential of the glass. X-radiation or high energy electron exposure may be employed to photoprecipitate atomic silver. However, it is generally more convenient to use a source of ultraviolet radiation in the 2800–3500 Å range, for example the familiar mercury and mercury-xenon arc lamps. The invention is so described then.

The initial exposure causes no apparent change in the glass, but is believed to photoprecipitate silver in atomic form. The time of this initial exposure, while creating no visual change, nevertheless determines the ultimate color developed in the exposed glass. Thus, with increasing initial exposure time, the ultimate glass color progressively varies from yellow to orange to red to purples and deep burgundy.

Following the initial exposure, the article is heat treated at a temperature intermediate the glass transformation range and the glass softening point. It is believed this heat treatment has a dual purpose. First, it causes atomic silver to agglomerate into nuclei. Next, it causes lithium bromide to grow on the nuclei thus formed. To this end, the glass may be heated initially in the lower portion of the temperature interval, and then heated at a higher temperature. For example, a typical schedule is one half hour at 450° C. followed by one hour at 540° C.

The glass article, containing nucleated lithium bromide, is now cooled preparatory to further processing. As explained later, the cooled glass contains lithium bromide spherulites having dissolved therein silver bromide. The latter is believed to be concentrated near the spherulite surface.

The article is then given a second radiation exposure and a second heat treatment to develop the latent color potential stored in the glass by the earlier treatment. These second treatments may be carried out separately. In such case, the exposure may be as previously, but somewhat longer in time, usually about an hour. The time of this exposure determines color intensity. As before, the temperature of the heat treatment, if a separate step, is between the glass transformation range and softening point.

It has been found, however, that the second exposure and the second heat treatment can be combined in the present procedure in the same manner as disclosed by Ference in U.S. Pat. No. 4,092,139 for the earlier sodium fluoride glasses. It has further been found that the combined exposure and heat treatment should not be at a temperature greater than 300° C., and is preferably at 200° C. to 300° C. for a period of five minutes to an hour depending on desired color shade and intensity.

The sensitivity or speed of silver precipitation is similar to that in the earlier, fluoride-type polychromatic glasses. "Nucleation", that is initial exposures, are in the range of 2–60 seconds, while "development" (second step) exposures require 5 minutes to an hour. If the glass is overly reduced, a yellow color will develop during the heat treat cycle in areas of the glass which have not received an initial ultraviolet treatment. Also, brownish hues form in the normally colored areas during the development exposure.

The present lithium bromide (LiBr)-type polychromatic glasses have a totally different microstructure from that of standard NaF. (Na,Ag)Br glasses, as is illustrated by transmission electron micrographs. The NaF. (Na,Ag)Br glasses are described in the Pierson-Stookey patent as being characterized by cubic and pyramidal-type halide crystals. In contrast, these forms are absent from the present glasses. Instead, scattered spheres of mixed low and high density material are observed which are apparently crystalline and which X-ray diffraction identifies as lithium bromide.

There is some question whether the spheres observed are normal spherulites, that is, radiating crystalline fibres or dendrites from a single silver nucleus, or whether the sphere is a relict structure inherited from a heterogeneously nucleated liquid-liquid phase separation induced by silver nuclei. The melting point of LiBr (approximately 560° C.) is close to the growth temperature of 540° C. Hence, a fluxing action of solid solution components, such as AgBr, could allow direct precipitation of a halide liquid droplet. On the other hand, the growth could have initiated below the melting point as a normal spherulite with subsequent melting. Melting would be expected to smooth the spherical shape, and such apparent uniformity is in fact observed. In any event, the unstable bromide liquid would certainly have crystallized as it cooled below 500° C., so a crystalline, basically-LiBr spherulite of some type is present.

The observable silver is easily seen by its strong electron absorption due to its density. It appears concentrated at the surface of the spherulite in an irregular patchy pattern. Such a "polar cap" morphology for silver has often been suggested as a likely structure for darkened AgCl-based photochromic glass. In the present polychromatic glasses, silver reduced and precipitated by the short first, or "nucleation", exposure represents a small proportion of the ionic silver available. It forms the original silver nuclei upon which LiBr, either in solid or liquid form, crystallizes.

AgBr forms complete solution in both liquid and solid states with LiBr, and silver has a great affinity for bromide. Hence, the bulk of the remaining silver ions will be concentrated in the bromide phase. Upon cooling, the last remnants of bromide liquid to crystallize will be rich in silver, since AgBr melts around 420° C. This silver-rich halide is apparently concentrated at the surface of the spherulite, during the late stages of crystallization, as a "polar cap"-type of patch or as a semi-complete coating. During the final ultraviolet exposure, it is photoreduced to metallic silver.

The anisotropic nature of the "polar cap" metal film, which can be quite irregular, will produce a splitting of the silver absorption peak at 415 nm, and will cause one or more components of absorption in the visible spectrum. Thus, as in the case of the normal polychromatic glass, anisotropic silver formation occurs and can explain the basis of color formation.

All glasses in the prescribed composition area could be made to photoprecipitate silver through the well-known ultraviolet and thermal reactions involving silver and cerium ions:

$$Ce^{+3} + Ag^{+1} \xrightarrow[310 \text{ nm}]{\text{u.v.}} Ce^{+4} + Ag° \quad \text{(electron donation)}$$

$$nAg° \xrightarrow{450° \text{ C.}} Ag_n \quad \text{(agglomeration)}$$

The silver nuclei so formed can nucleate lithium bromide and grow into the spherical shape of solid spherulites or liquid droplets, depending upon temperature. Silver is concentrated in the last liquid through fractional crystallization on cooling, and patches of silver rich bromide, (Ag,Li) Br, form on the surface of the halide spheres.

A second and longer ultraviolet exposure and heat treatment produces irregular patches, or "polar caps", of metallic silver on the surface of the spherulite. This results in splitting of the normal symmetrical silver band in the near ultraviolet, and causes a visible absorption component whose wavelength is a function of the degree of anisotropy.

Heat treatment at temperatures up to about 600° C. does not result in the growth of halide particles greater than 1000 Å diameter. Hence, haze level in a glass is minimal with such heat treatments. However, heat treatments at higher temperatures, i.e., near 700° C. result in both haze and silicate crystallization.

The color hue is primarily a function of the initial exposure dose, whereas color intensity is controlled by the length of the final exposure. Thus, with a constant final exposure of about one hour, the color varies, according to the initial exposure, from colorless (zero exposure) through yellow, orange, pinkish-red, purple, blue-purple to deep burgundy. If the final exposure is reduced to 15 minutes, the sequence is generally similar, but orange and pinkish-red are omitted: yellow, mauve, purple and deep burgundy. The intensities are also less. Pure blue and green tones have never been observed, possibly because the greatest elongation of silver particles is required to produce an absorption band in the red end of the visible spectrum. With a partial spherical film morphology, this apparently is not easily achieved.

The most unique feature of the silver-doped lithium bromide polychromatics is their ability to undergo complete thermal bleaching well below the softening point of the glass. The complete original color pattern may be subsequently redeveloped using only a flood ultraviolet exposure on a hot plate. The color sequence as temperature increases is purple, burgundy, red, orange, yellow. The yellow color in the hot glass heated for long periods above 600° C. tends to disappear upon cooling. Reheating causes the yellow to return. Placing the cool colorless glass on a hot plate between 200° and 300° C. under ultraviolet radiation causes the original purple color to return.

Thus, a photosensitivity induced pattern of dark colors can be thermally bleached to give only a yellow vestige of the original pattern. This yellow vestige disappears as the glass is cooled, but reappears if it is reheated. On the other hand, the complete pattern of dark colors can return if the colorless sample is reheated on the hot plate under ultraviolet illumination. This pattern is again stable unless a glass is reheated to above 300° C. Thus, the orginal color pattern is stable to 300° C. but its "memory" in the glass (its ability to be reproduced after bleaching) is evidently stable to somewhere near the softening point for the glass.

It is suspected that the thermal bleaching and regeneration characteristics are related to the low melting point of LiBr and LiBr-AgBr solid solutions. Evidently, a fully colored glass can have its silver reoxidized and redissolved as the LiBr crystals melt around 560° C. This imparts a pale yellow hue to the hot glass which vanishes on cooling. The surprising feature is that repeating the hot plate ultraviolet development exposure re-reduces the silver in apparently the same geometry (and, therefore, the same hue and intensity) as was present after the first color development. This "memory" must be related to the size and distribution of the spherulites as well as their Ag-content, which was presumably fixed by the original nucleation ultraviolet exposure and the original growth cycle for the LiBr spheres. Remelting and recrystallization on cooling, and re-photo-precipitation of silver evidently faithfully repeat the second part of the original cycle.

This unique ability to totally bleach the color patterns, and later faithfully reproduce them in a single exposure to ultraviolet radiation, provides a new memory capability. Potential applications include optical memory storage in a transparent medium, transmission of secret messages, color pattern indicators for maximum temperature, and reversible thermo-optical switches.

The basic differences between the present polychromatic glasses based upon silver-doped lithium bromide, and the original polychromatic glasses based upon the silver-containing sodium halides, are believed related to the totally different microstructures. The orginal polychromatics are characterized by dendritic elongated pyramids with the silver concentrated at the apices. The present glasses show only halide spherulites with the silver concentrated at the surface of the sphere in irregular "polar cap" patches. This explains the relative lack of saturated or pure colors in the present LiBr glasses, as well as the incomplete (in the blue-green) color spectrum. Instead of the linear elongation of silver particles, have a spherically-curved and irregular two-dimensional geometry of silver.

The color sequence as a function of first exposure dose appears somewhat erratic and, to a degree, opposite to that of the standard polychromatic glasses. Instead of a definite progression in visible absorption from long wavelength across the visible spectrum as a function of first exposure dose, we observe more an increasingly intense visible absorption band with a somewhat haphazard dominant wavelength varying between 500 and 600 nm. Coincident with this effect is a shift in the long ultraviolet absorption component from the wavelength typical of spherical silver ($\sim$415 nm) to shorter values.

This latter effect may be at least partially explained on the basis of silver availability. Thus, if the initial exposure flux is increased, the number of silver nuclei formed increase, and, consequently, the number of lithium bromide spherulites having silver ions dissolved therein. Ultimately then, more patchy "polar caps" at spherulite-glass interfaces are formed by silver reduction. In turn, then, there is less silver content in the remaining or matrix glass, and hence less opportunity to form independent, isotropic silver particles in this glass. The exact geometric control of silver particles forming during the development exposure at the spherulite-glass interface is unknown, but the colors for a given composition appear reproducible, so there must be some controlling forces.

SPECIFIC EMBODIMENTS

The invention is further described with reference to several exemplary polychromatic glasses. TABLE 1 sets forth the glass compositions as calculated in parts by weight on an oxide basis from batch compositions. The initial four oxides represent base compositions which approximate 100 parts in each case. The remaining ingredients may then be considered as additives. Since it is not known how the halogens are combined, they are shown independently in accordance with standard practice in this respect.

TABLE I

|  | 1 | 2 | 3 | 4 | 5 | 6 | 7 | 8 | 9 | 10 | 11 | 12 |
|---|---|---|---|---|---|---|---|---|---|---|---|---|
| $SiO_2$ | 76.0 | 82.5 | 76.0 | 76.0 | 76.0 | 76.0 | 76.0 | 78.0 | 76.0 | 78.0 | 76.0 | 76.0 |
| $Al_2O_3$ | 8.0 | — | 8.0 | 8.0 | 8.0 | 8.0 | 8.0 | 6.0 | 6.0 | 6.0 | 8.0 | 8.0 |
| $Li_2O$ | 16.0 | 17.5 | 16.0 | 16.0 | 16.0 | 16.0 | 16.0 | 16.0 | 14.0 | 16.0 | 16.0 | 16.0 |
| $Na_2O$ | — | — | — | — | — | — | — | — | 4.0 | — | — | — |
| Br | 6.0 | 8.0 | 8.0 | 8.0 | 8.0 | 8.0 | 8.0 | 10.0 | 10.0 | 10.0 | — | — |
| Cl | — | — | — | — | — | 1.0 | — | — | — | 2.0 | — | — |
| I | — | — | — | — | — | — | 1.0 | — | — | — | 0.10 | 0.15 |
| Ag | 0.03 | 0.10 | 0.10 | 0.10 | 0.10 | 0.10 | 0.10 | 0.20 | 0.15 | 0.12 | 0.10 | 0.20 |
| $CeO_2$ | 0.10 | 0.10 | 0.10 | 0.10 | 0.10 | 0.10 | 0.10 | 0.10 | 0.10 | 0.10 | 0.10 | 0.16 |
| SnO | 0.10 | — | 0.10 | 0.20 | 0.40 | 0.10 | 0.10 | 0.10 | 0.10 | 0.10 | 0.10 | 0.08 |
| $Sb_2O_3$ | 0.20 | 0.20 | 0.10 | 0.20 | 0.20 | 0.20 | 0.20 | 0.10 | 0.10 | 0.10 | 0.10 | — |
| $Cu_2O$ | 0.20 | 0.20 | 0.10 | 0.20 | 0.20 | 0.20 | 0.20 | 0.10 | 0.10 | 0.10 | — | — |

Actual batch ingredients used in melting corresponding glasses included high purity sand, A-14 alumina, lithium carbonate, lithium halides, silver nitrate and oxides of the remaining additives. Compounds which convert to oxides and/or halides during melting might be substituted in accordance with standard melting practice. Thousand gram batches were compounded for present purposes, but it will be appreciated that these can readily be scaled up for larger scale melts.

Batch ingredients were ball milled together to improve homogeneity and then run into platinum crucibles. The batch filled crucibles were placed in an electrically-fired furnace operating at about 1300° C. They were held at such temperature for four to six hours with stirring to provide homogeneous melts. Each melt was poured into steel molds to produce slabs or plates about 6 inches by 6 inches by ¼ inch (15 mm × 15 mm × 0.64 mm) and those bodies annealed at about 400° C. The annealed articles were clear, colorless glass.

Each glass slab or plate was subdivided to provide a series of samples. These were subjected to a series of actinic radiation exposures and subsequent heat treatments in the general manner heretofore disclosed for polychromatic glass development.

Each group of samples was initially exposed to ultraviolet radiation of about 300 nm wavelength from a vapor arc lamp to photoreduce the ionic silver to a metal atom form. The lamp used was a high pressure, Hg-Xe vapor lamp delivering 2500 watts total power and identified as HVF 2500-5. The lamp was mounted within a parabolic reflector as part of a mirror and lens optical system which essentially collimated the radiation as it was transmitted over a total distance of about 40 inches and directed downwardly onto the glass supported in a horizontal position. The optical system was one available from Optical Radiation Corporation, Azusa, Calif. and identified as ORCON II-Model 390.

Differences in ultimate color developed in the glass samples depended on the length of this initial exposure which varied from two seconds to a full minute. The samples were colorless in unexposed areas, and either colorless or pale yellow in exposed areas, depending on intensity of the exposure.

The samples were then heat treated for 30 minutes at 450° C. to aggregate the metallic silver into nuclei. The temperature was then raised to 540° C. and held there for one hour to grow lithium bromide spherulites on the silver nuclei. The glass samples were then cooled. During the silver nuclei growth, most samples remained clear and colorless, although a faint yellow developed in some.

At this stage, the samples might be subjected to a further radiation exposure followed by a further heat treatment. However, as Ference found with the prior sodium fluoride glasses, these treatments may be combined and carried out at a substantially lower temperature. Thus, the present samples were heated on a hot plate at 250° C. while exposed to ultraviolet radiation, as before, for a period of one hour, and then cooled.

As pointed out earlier, the present lithium bromide glasses characteristically produce this series of colors with increasing initial exposure: yellow, orange, pink, purple, deep purple to deep burgundy. The actual color series with any given glass may, however, vary slightly within this general framework. TABLE II sets forth the color series observed with each glass after the development schedule just described. It will be recalled that initial exposure varied from two to 60 seconds, e.g., 2, 5, 10, 15, 30 and 60 seconds being typical exposure times.

TABLE II

| Example | Color Range |
|---|---|
| 1 | yellow to salmon |
| 2 | yellow to grey pink |
| 3 | yellow to orange to lavender to blue to purple to burgundy |
| 4 | yellow to orange to dark pink |
| 5 | brown to dark brown |
| 6 | yellow to orange |
| 7 | yellow to pale brown to brown |
| 8 | yellow to dark purple |
| 9 | yellow to orange to red to purple to red |
| 10 | yellow to orange to pink to purple |
| 11 | clear unexposed, monochrome green exposed |
| 12 | yellow to pink to purple |

TABLE II-continued

| Example | Color Range |
| --- | --- |
|  | to burgundy |

Figure 1:
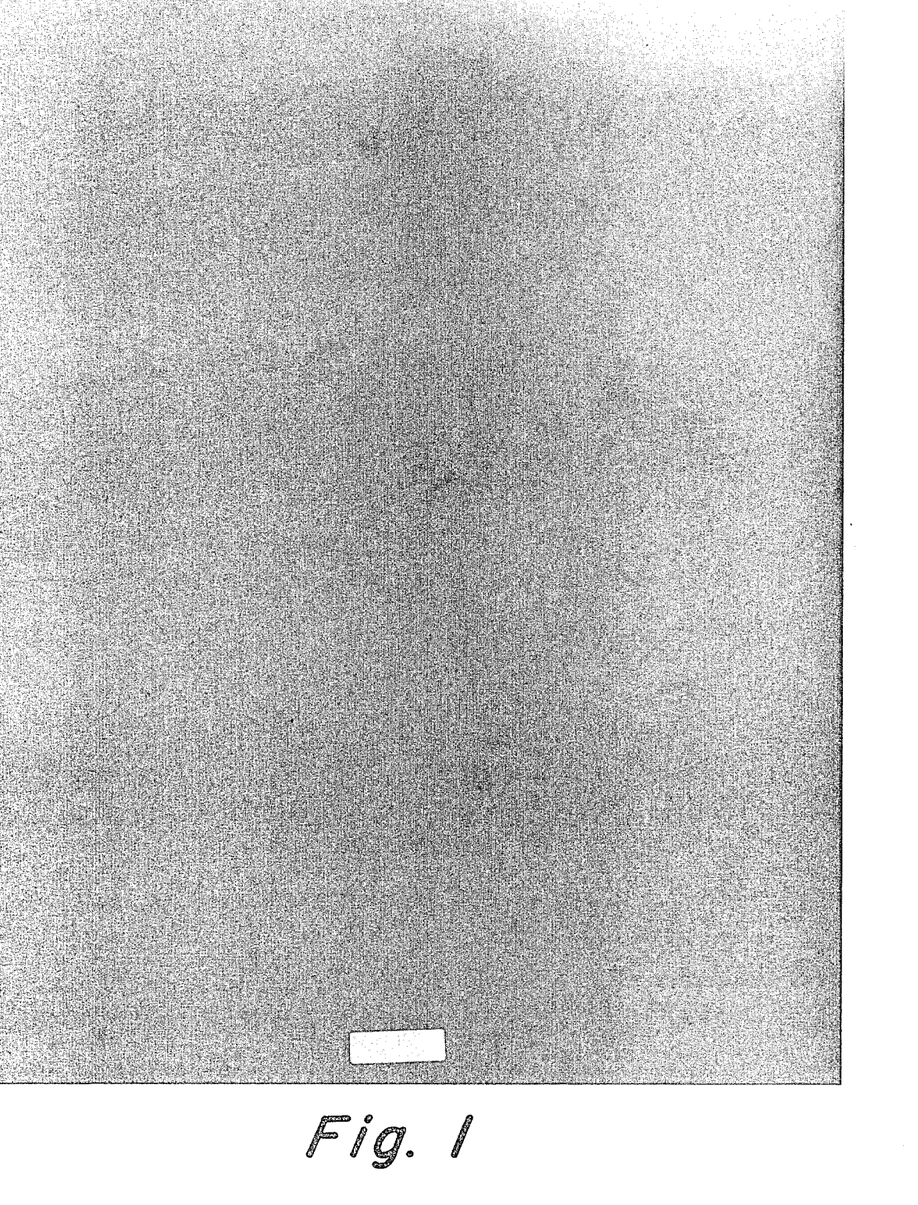
FIGS. 1 and 2 are transmission electron micrographs taken on thin sections of developed polychromatic glasses in accordance with the present invention.
Figure 2:
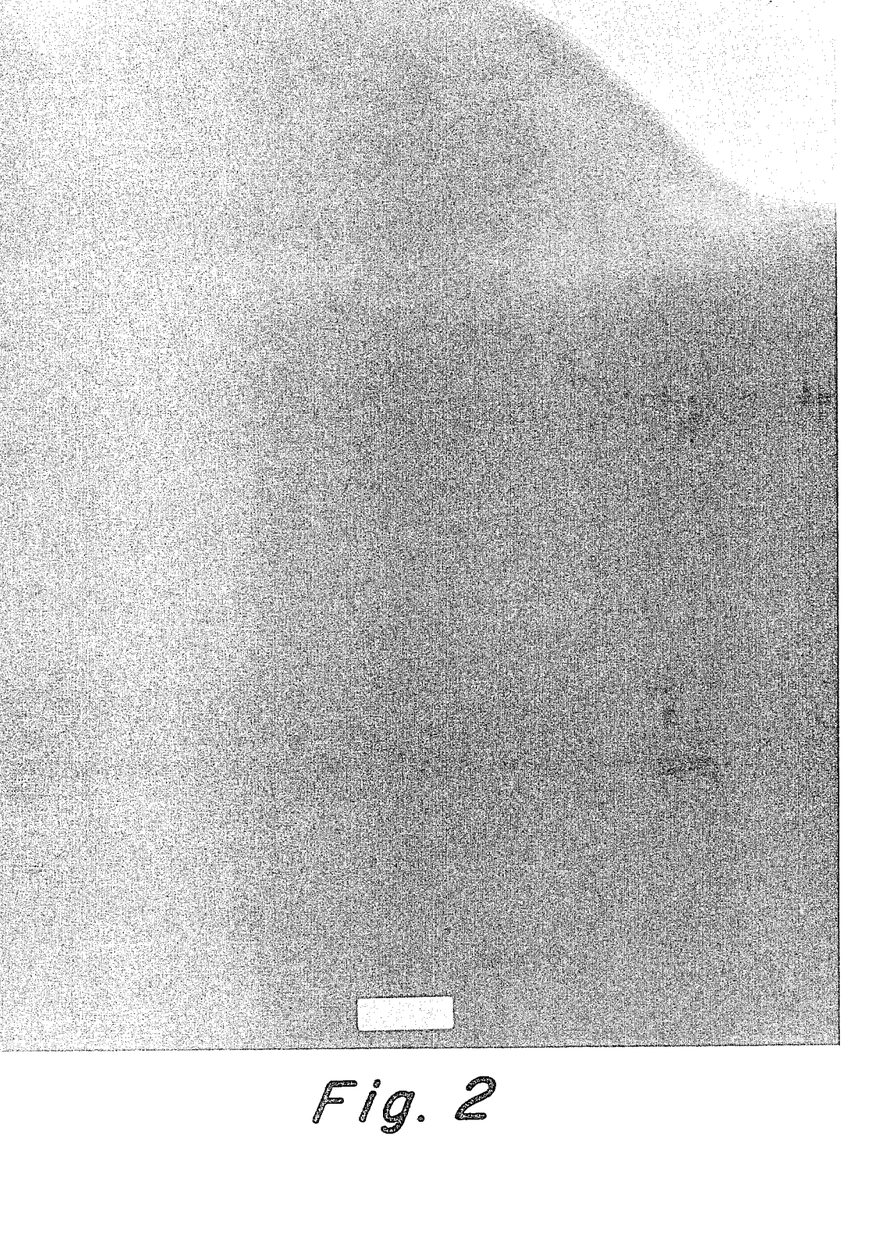

Thin glass sections, suitable for use in preparing transmission electron micrographs, were prepared by known ion-thinning procedures. These sections were prepared from a sample of developed glass having the composition of Example 3 in TABLE I. The micrographs were taken on a JEOL Model 100 CX electron microscope available from JEOL (USA) Inc., 11 Dearborn Road, Peabody, Mass., 01960.

The micrographs are prepared from extremely thin random sections or slices through the glass. However, the slice is of sufficient thickness that some crystals will lie entirely within the section. In transmission then, a two-dimensional projection of a three dimensional crystal is seen, thus providing only a partial picture of a given crystal. Nonetheless, numerous observations tend to confirm a generally spherical crystal form as the characteristic crystal morphology of the present glasses.

FIGS. 1 and 2 are transmission electron micrographs taken on sections of the Example 3 glass. The dark, essentially circular areas in the micrograph are lithium bromide spherulites. FIG. 2 particularly shows irregular patchy layers of silver at or on the surface of the spherulites.

Figure 3:
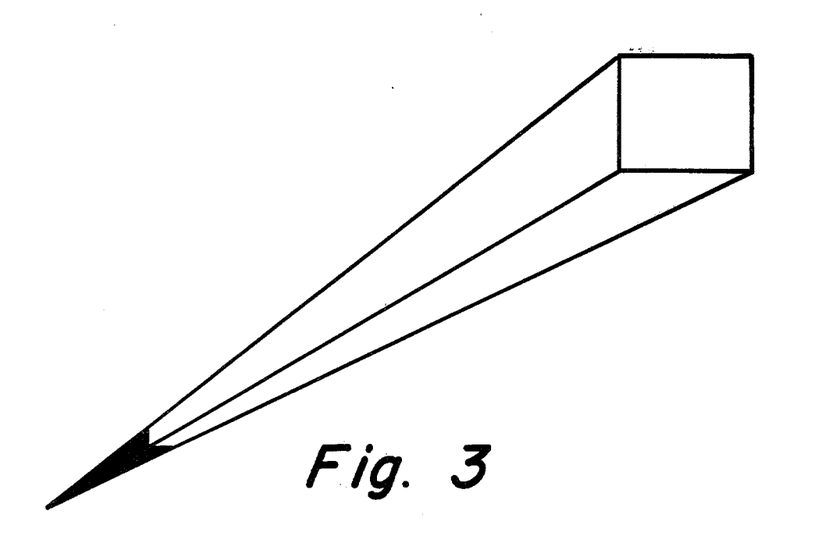
FIG. 3 is a graphic or schematic drawing illustrating the crystal structure observed in a prior polychromatic glass.
Figure 4:
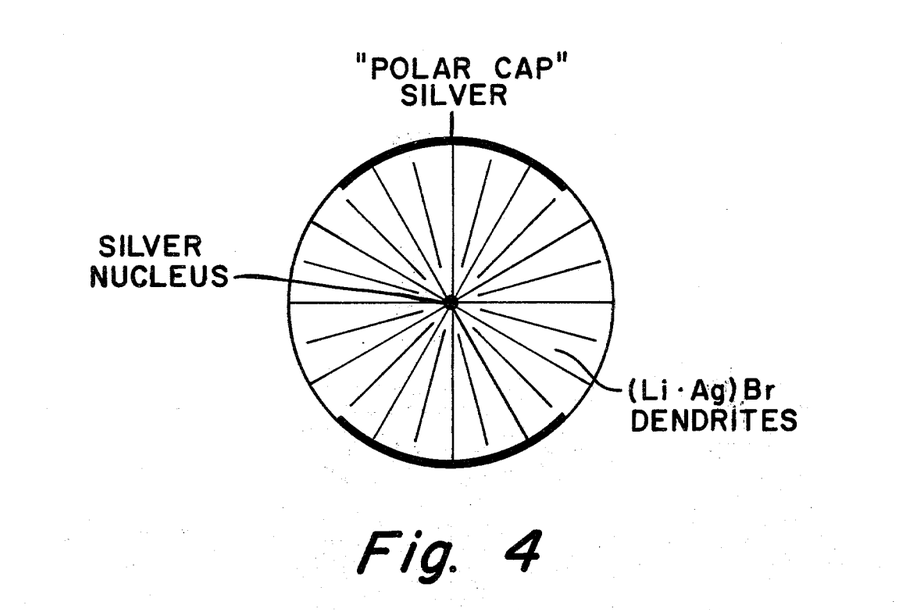
FIG. 4 is a graphic or schematic drawing illustrating in cross-section, the crystal structure observed in FIG. 2.

By way of further illustrating the characteristic crystal structure of the present invention, reference is made to FIGS. 3 and 4. These are graphical or schematic drawings illustrating, in greatly enlarged cross-section, the crystal structures observed in prior sodium fluoride type polychromatic glasses (FIG. 3) and present lithium bromide type glasses (FIG.4).

FIG. 3 is a copy of FIG. 2 in the Pierson-Stookey U.S. Pat. No. 4,057,408. It depicts the acicular morphology of the complex sodium fluoride-mixed halide crystals characteristically observed in the colored glasses of that patent. The blackened tip of the pyramidal type crystal represents silver concentrated in or on the tip of the crystal and considered to be the basis for color in the glass.

FIG. 4 illustrates the appearance of the crystals observed in the present glasses after color development. Thus, dendritic crystals of lithium bromide extend radially from a minute silver nucleus to give a generally spherical appearance in cross-section. The precipitated silver occurs in thin 37 polar cap" patches along the surface or extremities of these spherulites. This is shown as a darkened layer or line along the surface.

Figure 5:
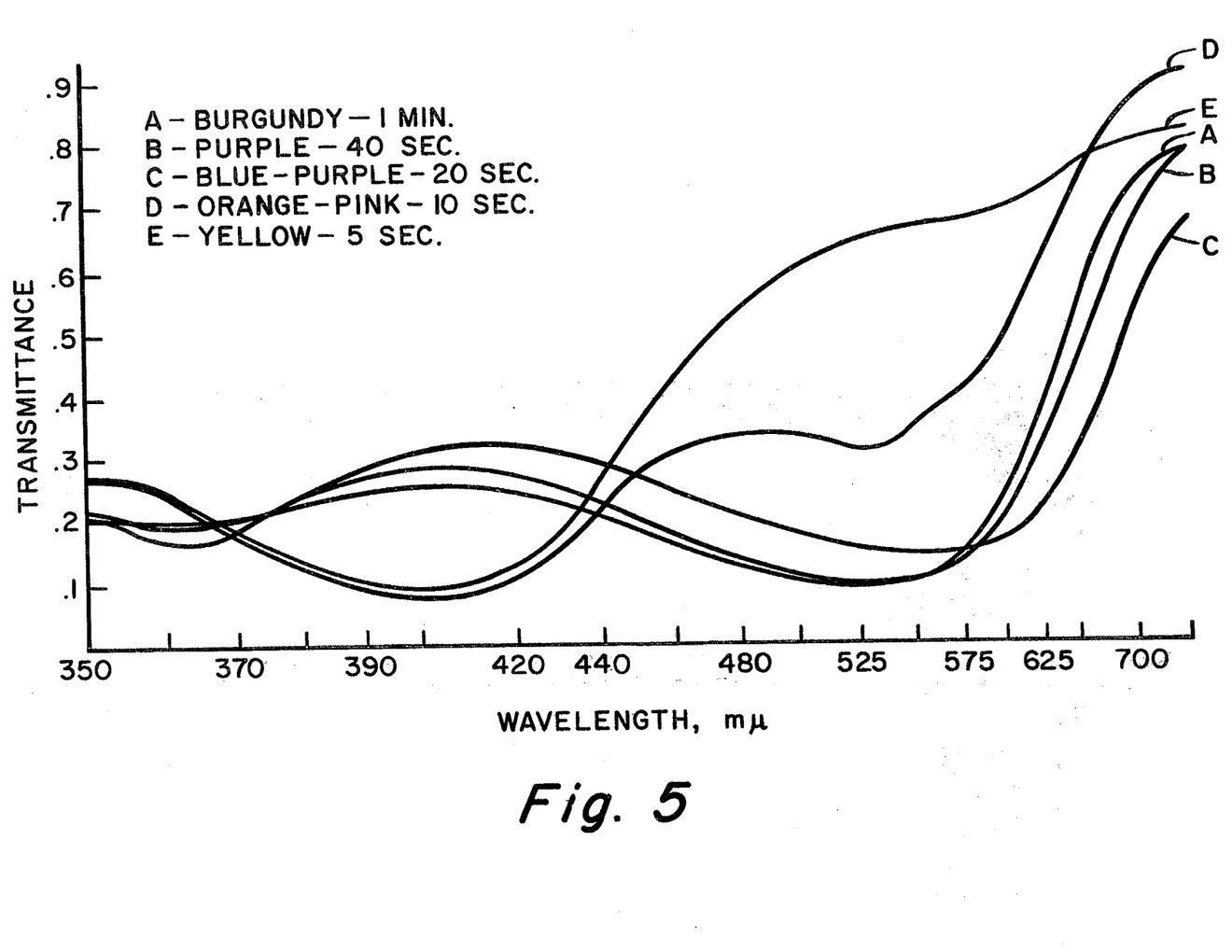
FIG. 5 is a graphical illustration of a typical series of colors developed in a glass according to the invention.

FIG. 5 illustrates graphically, in terms of percentage spectral transmission versus wavelength of transmitted light, the succession of colors attainable in the present glasses. In this graph, percentage transmission is plotted along the vertical axis and wavelength of light, in nanometers, along the horizontal axis. TABLE III shows the identifying letter of each curve, the time of initial exposure for the glass measured and represented by the curve, and the color observed in the glass.

TABLE III

| Curve | Time (sec.) | Color |
| --- | --- | --- |
| A | 60 | Burgundy |
| B | 40 | Purple |
| C | 20 | Blue-purple |
| D | 10 | Orange-pink |
| E | 5 | Yellow |

I claim:

1. A silver-containing polychromatic glass article wherein the glass composition has a total silver content of at least 0.005% by weight, and at least a portion of the article is characterized by the presence of spherulites of lithium bromide (LiBr) crystallized on silver nuclei and by color-producing, anisotropic silver films at or on the surface of the LiBr spherulites.

2. A polychromatic glass article in accordance with claim 1 wherein the glass is a lithium silicate type.

3. A polychromatic glass article in accordance with claim 1 wherein the glass is a lithium aluminosilicate type.

4. A polychromatic glass article in accordance with claims 2 or 3 wherein the content of lithia in the glass is above 10% by weight.

5. A polychromatic glass article in accordance with claim 3 wherein the alumina/lithia ratio in the glass is below one.

6. A polychromatic glass article in accordance with claim 5 wherein the lithia content in the glass is above 10% by weight.

7. A polychromatic glass article in accordance with claim 1 wherein the glass has a bromine content, in percent by weight on an analyzed basis, of 1–4%.

8. A polychromatic glass article in accordance with claim 1 wherein the glass contains cerium oxide as a photosensitizer.

9. A polychromatic glass article in accordance with claim 1 wherein the glass contains tin oxide and antimony oxide as thermo-reducing agents.

10. A polychromatic glass article in accordance with claim 1 wherein the glass composition, in weight percent on a calculated oxide basis, is composed essentially of 70–85% $SiO_2$, 0–15% $Al_2O_3$, 10–20% $Li_2O$, 0–4% $Na_2O$, 1–15% Br on a batch basis, 0–4% Cl, 0.01–0.3% $CeO_2$, 0–0.5% SnO, 0–0.5% $Sb_2O_3$ and 0.005–0.5% $Ag_2O$.

* * * * *